(12) United States Patent
Goodzey

(10) Patent No.: US 6,550,870 B1
(45) Date of Patent: Apr. 22, 2003

(54) PARKING BRAKE CONTROL

(75) Inventor: Gregory Paul Goodzey, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 53 days.

(21) Appl. No.: 09/941,330

(22) Filed: Aug. 29, 2001

(51) Int. Cl.[7] .............................................. B60T 13/22
(52) U.S. Cl. ............................. 303/9; 303/15; 303/20
(58) Field of Search ............................ 303/3, 11, 15, 303/20, 9

(56) References Cited

U.S. PATENT DOCUMENTS

| | | | | |
|---|---|---|---|---|
| 5,170,343 A | * | 12/1992 | Matsuda ........................ | 303/3 |
| 5,310,251 A | * | 5/1994 | Towers et al. ................ | 303/11 |
| 5,370,449 A | * | 12/1994 | Edelen et al. ................. | 303/3 |
| 5,704,693 A | * | 1/1998 | Mackiewicz .................. | 303/3 |

* cited by examiner

Primary Examiner—Matthew C. Graham

(57) ABSTRACT

An electrical circuit for selectively operating a vehicle parking brake (16) with the energizing and de-energizing of a coil (50) of a solenoid valve (30) in response to an operator input. The electrical circuit comprising a source of electrical energy (V Bat), an operator actuable switch (47) connected by line (59) to the coil (50) and a first microprocessor (49) which in turn is connected by an electronically controllable switch (45) through a low side driver (51) to connect line (57) from coil (50) with a ground (55) and a second microprocessor (53) connected to the first microprocessor (49) and electronically controllable switch (45) for detecting erroneous first microprocessor (49) operation. If the second microprocessor (53) detects an erroneous operation in the first microprocessor (49), the second microprocessor (53) assumes control and switches the electronically controllable switch (45) such that electrical energy (V Bat) is supplied to the low side driver (51) and as a result the actuation of coil (50) is under the direct control of the operator actuable switch (47) to effect a parking brake application.

4 Claims, 3 Drawing Sheets

PARKING BRAKE CONTROL

BACKGROUND OF THE INVENTION

1. Field of the Invention

The present invention relates to electronically controlled vehicle braking systems and more especially to an electronic control for a vehicle parking brake. The park brake system employs an electronic microprocessor control for advanced features along with a backup mode that allows for direct switch control when the electronic control unit has failed that reduces the probability of false apply due to control unit shutdown.

2. Description of the Related Art

Early parking brake systems employed a pedal or lever that was cable coupled to directly actuate certain ones of the vehicle's hydraulically actuated brake mechanisms, or to apply a separate (dedicated) brake mechanism. A simple approach to electrical control of parking brake systems having a spring apply and a hydraulic or air release is to use a two-position switch to supply current to activate a solenoid actuated valve. In such parking brake systems, the solenoid valve is usually connected in series with a parking brake control that is activated by pushing or pulling a plunger control normally located on a dash of the vehicle. The parking brake is applied by a spring that acts through a linkage to provide a mechanical force that moves friction linings into engagement with a drum or disc brake to effect a parking brake application. In order to release the parking brake, the solenoid valve is actuated to allow pressurized fluid to be communicated to an actuator which acts on a diaphragm or piston associated with the linkage. A hydraulic force developed by the pressurized fluid acts to compress the spring and thereafter move the friction linings away from the drum or disc brake. When energized, the solenoid valve holds pressure in the hydraulic cylinder that in turn holds the spring-actuated brake in the released position. This approach has a minimum number of components but does not allow for more advanced parking brake functions and decisions that can be achieved with bus-connected Electronic Control Units. (ECU's). The introduction of the ECU in the decision path advances function but can increase the probability of failure or shutdown of the system. Reliability estimates for the standard ECU are significantly lower than those for the direct switch control system. In such an electronically controlled parking brake system, turning off the solenoid valve results in application of the parking brake. Unfortunately, a failure in the computational section of the ECU results in a shutdown of the ECU and all of its actuators and in a shutdown state of the park brake function, the brake applied position. For safety purposes, it is desirable to avoid the inadvertent parking brake application especially while the vehicle is moving.

SUMMARY OF THE INVENTION

The present invention provides solutions to the above problems by normally computer controlling an electrical parking brake control signal in response to the condition of an operator actuable apply brake switch and other vehicle operating parameters while monitoring computer operation for continued proper performance. When computer monitoring indicates improper performance, an electrical signal is controlled in response to the position of the apply brake switch independent of computer control and the other vehicle operation parameters.

In the present invention, computer control of the application of electrical energy to a solenoid coil that actuates a parking brake release valve including the testing of computer operation to ascertain erroneous performance. Upon ascertaining erroneous computer performance, computer control of the application of electrical energy to the solenoid coil is relinquished and a manually actuable switch thereafter assumes control of the application of electrical energy to a solenoid coil. The computer control may include selectively applying electrical energy to the solenoid coil in response to the status of a manually actuable switch and the status of other vehicle operating parameters. The steps of relinquishing control and assuming control may be performed by circumventing computer control and coupling the manually operable switch directly in series with the solenoid coil and a source of electrical energy.

An advantage of the present invention is that failure of the electronic control unit does not result in parking brake application at inappropriate times. The probability of the park brake being applied due to failure in the ECU has been reduced by including a backup mode that is entered when the ECU has a failure.

DETAILED DESCRIPTION OF THE INVENTION

Figure 1:
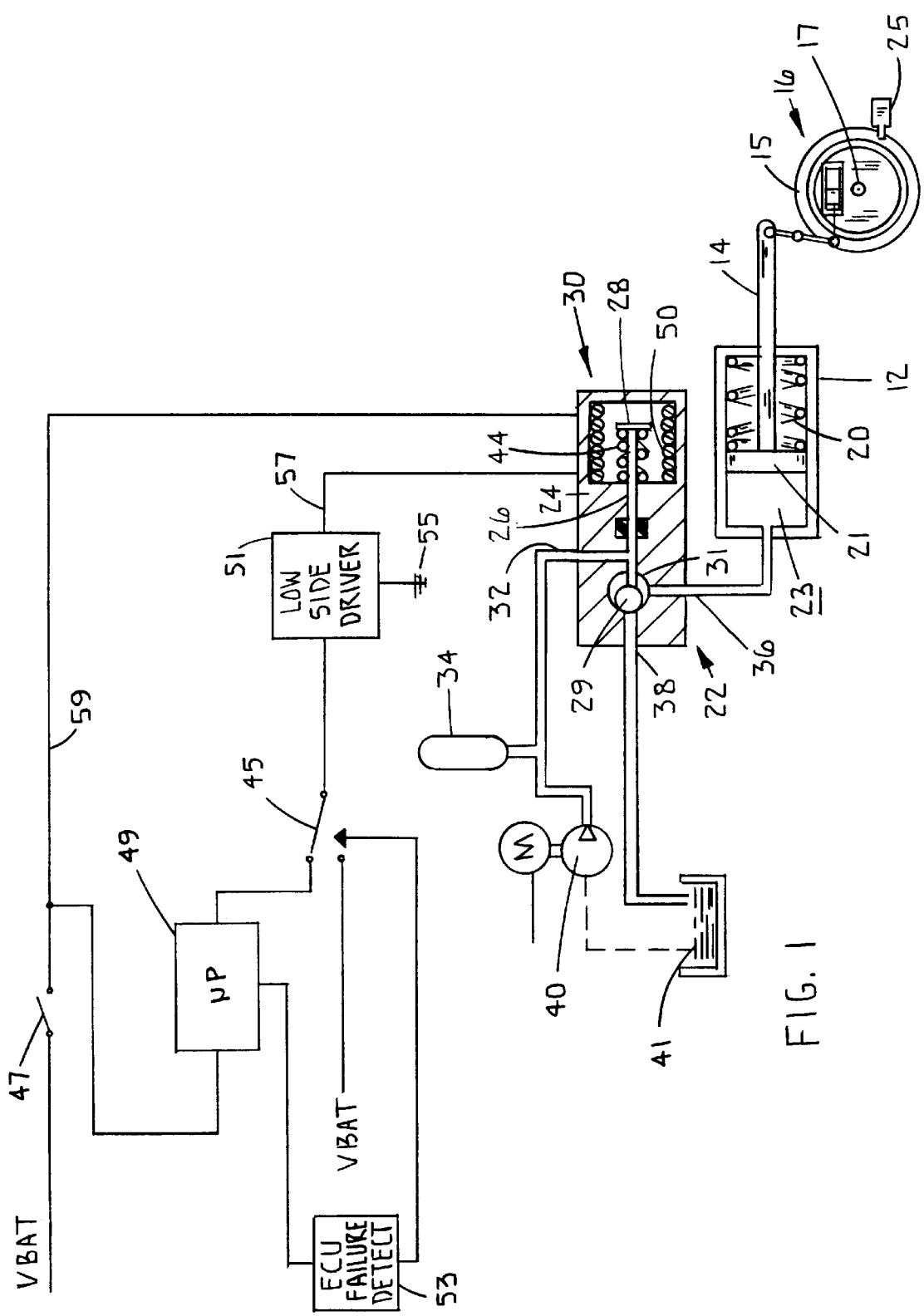
FIG. 1 is a schematic diagram of a control system and actuator assembly of a vehicle parking brake system incorporating the present invention.

Corresponding reference characters indicate corresponding parts throughout the several drawing views.

Figure 2:
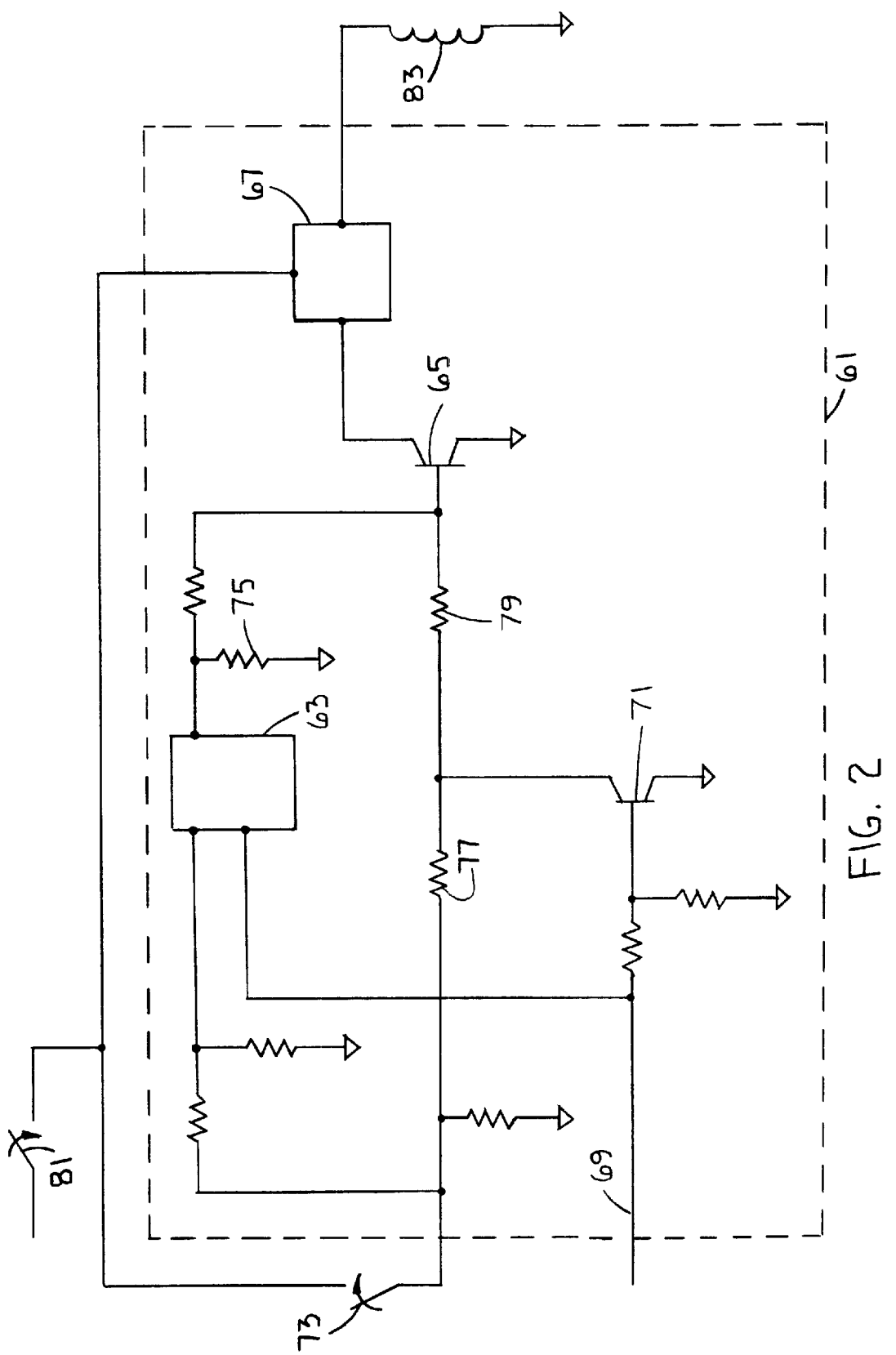
FIG. 2 is a schematic diagram of a variation on the control system of FIG. 1.

A brake system 10 as shown in is designed to provide a parking brake for a vehicle, which may be independent of the service brakes of the vehicle. The brake system 10 includes an actuator assembly 12 connected by linkage 14 to a parking brake 16 associated with a drum 15 secured to a shaft 17 in the drive train of the vehicle. The actuator assembly 12, which may be of the type disclosed in U.S. Pat. No. 5,704.693, has a spring 20 that acts on a piston 21 to supply a force through linkage 14 to move a friction member into engagement with drum 15 to mechanically effect an application of the parking brake 16 of the vehicle. The parking brake 16 is designed to remain in an applied position until released through the actuation of a hydraulic arrangement 22 by an operator actuable parking brake switch 47. The parking brake switch 47 which may be of a double pole single throw construction, is normally located on a dash panel of the vehicle and activated by an operator either pushing or pulling on a knob. However, if an operator activates the parking brake switch 47, an electronic control unit 61 as shown in FIG. 2 may override the actuation of the hydraulic arrangement if various vehicle operating parameters and/or conditions are present that could effect the safe operation the vehicle including but not limited to the following: ground speed, engine speed, the position of the transmission gear selector, the availability of hydraulic fluid pressure, operator input; electric current; and etc.

In more detail, the hydraulic arrangement 22 includes a housing 24 with a bore 26 therein for retaining a plunger 28 of a solenoid valve 30. Bore 26 has an inlet port 32 connected to a source of pressurized fluid available in an accumulator 34 associated with the service brakes of the vehicle, an outlet port 36 connected to the actuator assembly 12 for parking brake 16 and a relief port 38 connected to reservoir 41 for a motor driven pump 40 in the service brake system of the vehicle. A coil 50, retained in housing 24 and surrounding plunger 28, is connected to receive electrical current from a source (vehicle battery) in response to the closure of parking brake switch 47. The solenoid valve 30 has a spring 44 that acts on a plunger 28 to define a first position for the plunger 28 in bore 26.

In a first position for plunger 28, outlet port 36 is connected with relief port 38. With plunger 28 in the first position, any pressurized fluid in a chamber 23 associated with piston 21 in actuator assembly 12 is freely communicated to reservoir 41. With the fluid pressure in chamber 23 at the same fluid pressure (atmospheric pressure) of reservoir 41, resilient member 20 applies a force to mechanically move friction linings of the parking brake 16 into engagement with drum 15 to create a parking brake apply situation. Plunger 28 also has a second position that is established by movement of plunger 28 in bore 26 in response to the development of a magnetic force in coil 50 on actuation of parking brake switch 47 to a release position by an operator. With the plunger 28 in the second position, inlet port 32 is connected to outlet port 36 and pressurized fluid from accumulator 34 is supplied to chamber 23 in the actuator assembly 12. The pressurized fluid available in chamber 23 acts on piston 21 and after overcoming spring 20, provides a hydraulic force to move the friction linings out of engagement with the drum 15 and release the parking brake 16 to thereafter permit shaft 17 of the drive train to rotate and correspondingly the wheels to roll and allow movement of the vehicle.

The coil 50 of solenoid valve 30 is selectively enabled and disabled by the interaction of a controllable switch 45, operator actuable switch 47, microprocessor 49, and low side driver 51. The solenoid is enabled and the brake released by current flow between line 59 and vehicle ground 55. During normal vehicle operation, switch 47 is closed supplying battery voltage to line 59, and microprocessor 49 supplies vehicle battery voltage to low side driver 51 enabling that driver to connect line 57 to ground 55. Vehicle battery voltage as shown in FIG. 1 is only available when an ignition switch 81 shown in FIG. 2 is turned "on." Hence, under normal operating conditions, the parking brake 16 is released. Operator actuation is required to open the switch 47 and terminate transmission of battery voltage from line 59 to disable the coil 50 of solenoid valve 30 to allowing spring 20 to apply the parking brake 16. The microprocessor 49 may provide additional features not illustrated, for example, rendering switch 47 ineffective to apply the parking brake 16 while the vehicle is in motion, applying the parking brake 16 whenever the vehicle shift lever is moved to the "park" position, rollaway protection which insures that the parking brake 16 is not inadvertently released by merely turning the ignition switch "on" as well as others.

The brake system 10 of FIG. 1 includes a failure detect circuit 53 that continuously or periodically monitors the microprocessor 49 for continued proper operation. In the event an error is detected, circuit 53 causes switch 45 to move from the position show to connect the low side driver 51 directly to battery voltage. This battery voltage to driver 51 causes the driver 51 to maintain the connection between line 57 and ground 55. Hence, control of the coil 50 of solenoid valve 30 is given over directly to the switch 47 bypassing the malfunctioning microprocessor 49. The function of sensing for ECU failures may comprise microprocessor periodic self-test routines, repeating a task and comparing successive results, utilizing two or more different pieces of hardware to perform the same task and comparing their behaviors, and even something as mundane as computing the product of two numbers and comparing the result to a known value.

The schematic diagram of FIG. 2 illustrates another implementation of the present invention. Under normal operation, the software running in the microprocessor 63, for example, a type 8OC196CB, samples the state of the power parking brake switch 73, determines the desired state of the park brake, and drives transistor 65 and the high side driver 67 to the appropriate state. The EN signal on line 69 is high, turning on transistor 71 and preventing the state of the switch 73 input from directly affecting the base of transistor 65. When EN goes low indicating a failed ECU, the microprocessor 63 is held in reset and its 20 output, P2, is pulled low by resistor 75. Transistor 71 is now turned off and the switch 73 drives the base of transistor 65 through resistors 77 and 79. Hence, when a failure of the microprocessor 63 occurs, the operator actuable switch 73 bypasses the microprocessor 63 and more directly controls the solenoid valve coil 83 by way of high side driver 67.

Figure 3:
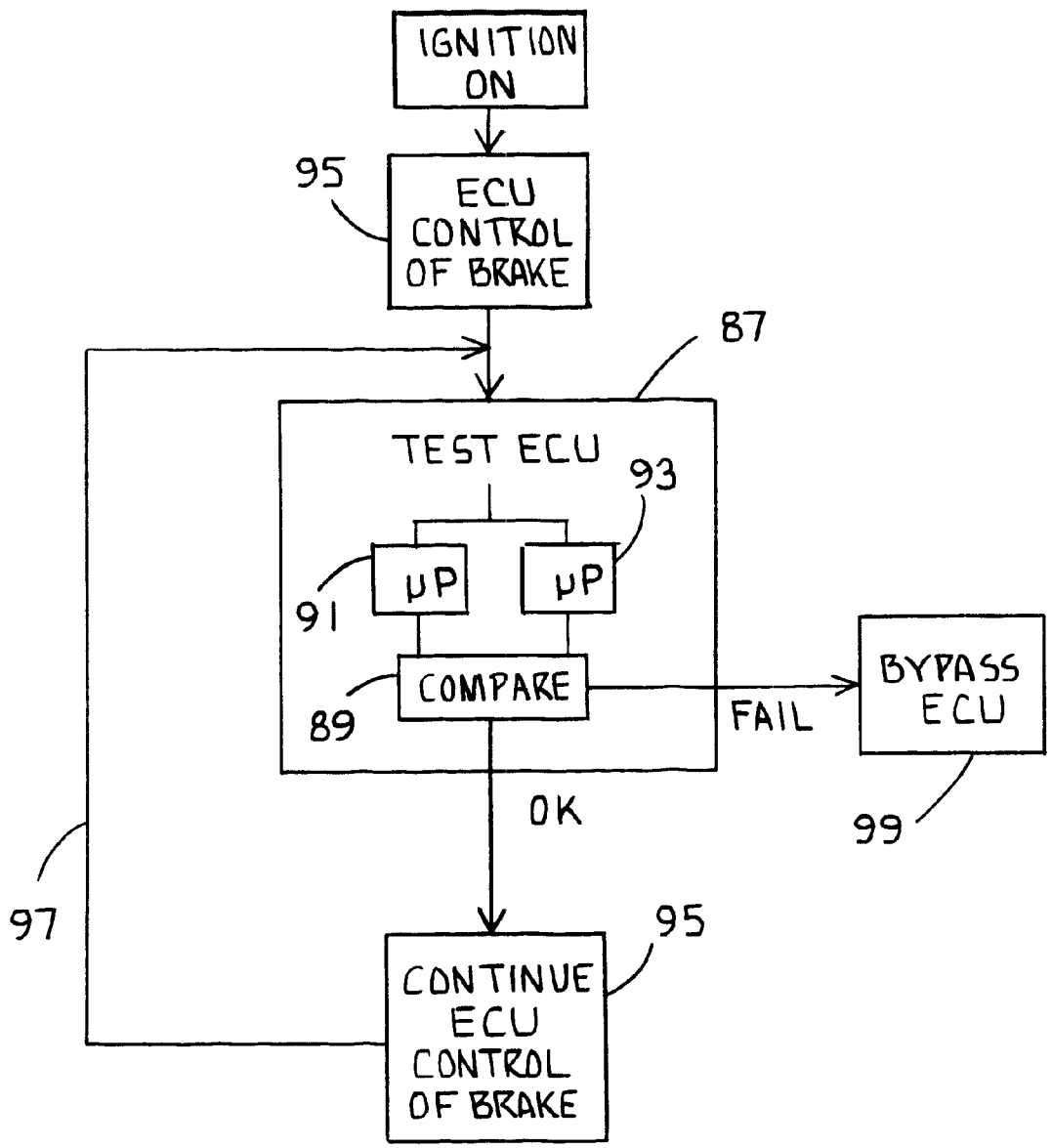
FIG. 3 is a schematic illustration of a portion of a process for controlling a parking brake actuator according to the present invention.

The process of the present invention is summarized in FIG. 3. When an ignition switch such as 81 is turned "on", electronic control of the parking brake is assumed by the ECU as indicated at 85. This control takes the form of controlling an electrical signal, such as the application of battery voltage, in response to the condition of an operator actuable apply brake switch 47 or 73 and other vehicle operating parameters. As indicated at 87, computer operation is monitoring for continued proper performance. The monitoring takes place as comparisons 89 of operations performed by a pair of microprocessors 91 and 93. So long as the comparison is favorable, process control by the ECU continues as indicated at 95 and the comparison periodically repeated as indicated by the feedback line 97. In the event of a microprocessor failure, the microprocessor is bypassed as shown at 99. Control of the electrical signal in response to the condition of the apply brake switch becomes independent of computer control and the other vehicle operation parameters when computer monitoring indicates improper computer performance.

What is claimed is:

1. An electrical circuit for selectively operating a vehicle parking brake in accordance with the energizing and de-energizing of a coil of a solenoid valve in response to an operator input, comprising a source of electrical energy, an operator actuable switch, a first microprocessor means, an electronically controllable switch, a low side driver means and a second microprocessor means for detecting erroneous first microprocessor operation, said circuit being connectable in a first configuration so long as no erroneous operation is detected and in a second configuration when erroneous operation is detected, said first configuration including said first microprocessor in a controlling relationship with the electronically controllable switch to control said low side driver through which a first electrical lead from said coil is connected to a ground on actuation of said operator actuable switch and said second configuration including an additional circuit including said source of electrical energy, said operator actuable switch, said second microprocessor means, said electronically controllable switch and said low side driver, said additional circuit being operable to control said electronically controllable switch to activate said low side driver and effect the communication of electrical energy from said coil to said ground through a second lead to bypass said first microprocessor and allow current flow from the source, through said operator actuable switch to said coil and from said coil through said electronically controllable switch to control the actuation of the parking brake as a function of said operator input.

2. The electrical circuit of claim 1, wherein said electronically controlled switch provides said low side driver control from said first microprocessor in said first configuration and continuous enablement in the second configuration.

3. The electrical circuit of claim 1, wherein said coil is coupled by said first lead said source of electrical energy through said electronically controllable switch.

4. The electrical circuit of claim 1, wherein said second microprocessor includes a watchdog circuit for comparing the operation of said first microprocessor with a predetermined standard to prevent enablement of said coil resulting from erroneous information.

* * * * *